April 15, 1958 C. A. BROWN 2,830,899
METHOD FOR PRODUCING A PRINTING PLATE
Filed April 20, 1955
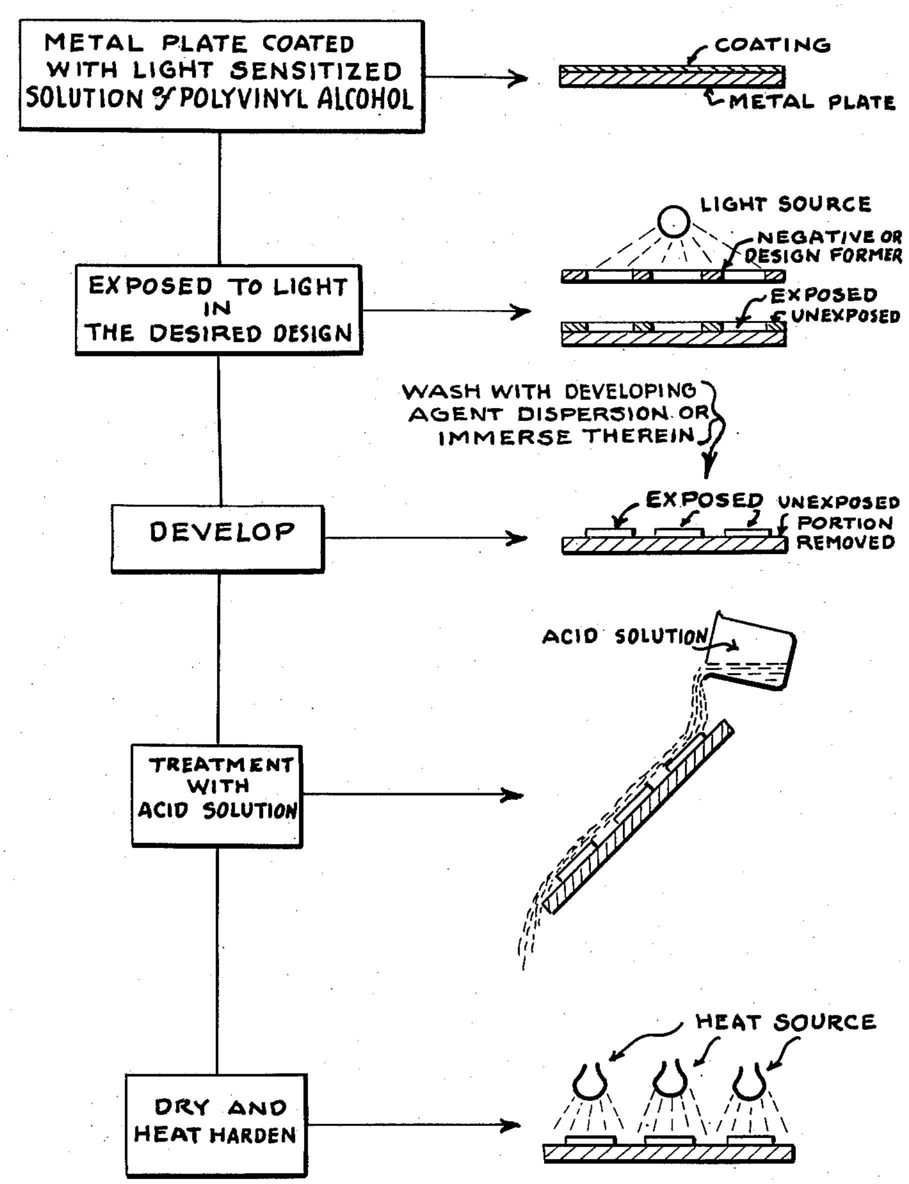
INVENTOR.
Clarence A. Brown
BY Owen & Owen 2,830,899

METHOD FOR PRODUCING A PRINTING PLATE

Clarence A. Brown, Toledo, Ohio, assignor to Jones Graphic Products Company, Albuquerque, N. Mex., a corporation of New Mexico Application April 20, 1955, Serial No. 502,554

10 Claims. (Cl. 96—36)

This invention relates to an improved method for producing a printing plate, and, more particularly, to such a method suited for the manufacture of light sensitized polyvinyl alcohol coated printing plates.

Various types of printing plates comprising a light sensitized coating on a metal plate have been in use for many years. It has heretofore been the common practice to provide metal plates with an acid resisting light-developed coating, called a "resist," carrying the matter to be printed, and etched in the areas not coated with the resist. Two widely used resisting materials have been fish glue and shellac, each of which has several disadvantages well understood in the art. After the sensitized coating has been exposed and the pattern formed thereon by rinsing away the unexposed portions of the coating, the plate is heat treated and given the usual acid etch. It is necessary to harden the coating which is usually done by a baking step involving heating of the plates to a relatively high temperature. For example, in the case of the common glue resist, the heat required is approximately 630° F. At this temperature, metal plates ranging in thickness from 0.010" to 0.065" warp and crystallize, which undesirably affects their chemical and physical properties. It has been necessary to tolerate this condition for many years past.

Printing plates comprising a light sensitized polyvinyl alcohol coating on a metal plate have been suggested, but difficulty has been encountered in the low degree of chemical resistance, adherence, and hardness, that has been produced by polyvinyl alcohol coatings. It has been proposed, also, to use polyvinyl alcohol as an ink-sensitive image on planographic lithographic plates, but in those instances where the image must print a solid color, and where many impressions are to be made from a printing plate, such coating has not, heretofore, been successful. Proposed coatings of polyvinyl alcohol have been found to absorb water and to exhibit a low degree of acid resistance even when hardened at temperatures ranging up to 550° F. These difficulties have militated against the general use of such polyvinyl alcohol resists. A discussion of an unsuccessful attempt to use them on light weight magnesium alloy plates will be found in "The Etching of Magnesium Alloys for Photoengraving," by Cox and Cannon, The Penrose Annual, 1950, pages 116–118 at page 117.

Cox and Cannon suggest that a process for manufacturing such polyvinyl alcohol coated metal printing plates should include the steps of exposing to light in a desired pattern a light sensitized polyvinyl alcohol coating on a metal plate, washing the exposed coating with water to remove unexposed portions of the light sensitized coating, treating the resulting partially coated plate with some kind of a hardening bath (chromic acid is stated to be unsatisfactory), washing away the hardening bath residue, drying and heat hardening the remaining film, and then etching the metal plate. In such process, because the pattern defined by the film remaining after washing away of the unexposed portions thereof represents the pattern to be reproduced in use of the plate for printing, it is desirable that the resist be colored after this step to facilitate examination of the pattern to be expected in the finished plate.

Traditionally, the step of etching the exposed portions of the metal plate has been a tedious, delicate, and time consuming operation, requiring upwards of an hour for completion of a photoengraving plate. A recently developed process, however, makes possible the etching of a photoengraving plate within about five minutes. In the production of so-called "high etch plates" (photoengraving plates produced on thin metal for use in offset printing) the etching step requires at least about eight hours by traditional methods, but can be accomplished in a matter of minutes by the recently developed process. The rapidity of this etching operation is manifestly advantageous economically. However, light sensitized coatings heretofore known are degraded to such an extent in the course of such etching that the finished printing plate is unsatisfactory for use.

The present invention is based upon the discovery of a method for producing light sensitized polyvinyl alcohol resists on metal plates, which method includes, prior to the application of a hardening bath, a treatment that substantially increases the resistance to acid etching solutions of such polyvinyl alcohol films. Light sensitized polyvinyl alcohol films produced according to the invention are several fold more resistant to acid etching solutions than are ordinary polyvinyl alcohol films, and will withstand without appreciable degradation even the newly developed, rapid, deep etching process discussed above.

It is, therefore, an object of the invention to provide a method for producing a chemically resistant, adherent, and hard, light sensitized polyvinyl alcohol resist on a metal base plate.

It is a further object of the invention to provide a printing plate carrying a hardened polyvinyl alcohol resist in a desired pattern treated, prior to etching of the plate, to increase its resistance to acid etching solutions.

Other objects and advantages of the invention will become apparent from the description which follows, and from the accompanying drawing, which is a schematic flow diagram representing the steps involved in the production of a printing plate according to the invention.

According to the invention a method for forming a printing plate is provided. The method of the invention comprises coating a metal base plate with a dichromated polyvinyl alcohol dispersion, exposing the coating to light in a desired design, washing from the metal base plate portions of the coating not affected by the light with an aqueous dispersion containing a developer for the dichromated polyvinyl alcohol, subjecting the light-affected design of the coating to an aqueous chromic acid solution hardening bath, washing the plate to remove the acid solution, and drying and heat hardening the coating on the metal base plate.

The term "dispersion" is used herein, and in the appended claims in its generic sense as including solutions, suspensions, emulsions and other stable solid in liquid or liquid in liquid compositions. The expression "dichromated polyvinyl alcohol dispersion" is used to mean aqueous dispersion containing both polyvinyl alcohol and a dichromate.

The invention also provides a novel printing plate comprising a metal base coated with a developed dichromated polyvinyl alcohol in a desired pattern.

Polyvinyl alcohol resists are provided according to the invention on base plates made of metals commonly used for such purpose. Magnesium, zinc, copper, brass, stainless steel and aluminum are listed as examples of such metals. Because of characteristic difficulties encountered in previous attempts to produce polyvinyl alcohol resists on magnesium and magnesium alloy plates, particular advantage inheres in the production of polyvinyl alcohol resists on plates of such metal. However, plates of the other metals can also be used. Some logwood-containing developing solutions employed as hereinafter described attack certain aluminum alloys, so that plates of these alloys should not be used with such developing solutions.

The term "polyvinyl alcohol," in general, does not represent a single material, but a family of materials having varying degrees of polymerization and varying saponification numbers. Viscosity of a polyvinyl alcohol soluton is readily determined experimentally, and is generally used as a measure of degree of polymerization of the polyvinyl alcohol. For example, one manufacturer supplies polyvinyl alcohols ranging from a "low" degree of polymerization as indicated by viscosity of a 4 percent dispersion in water of from 4 to 6 centipoises to a "high" degree of polymerization as indicated by viscosty of a 4 percent water dispersion of from 35 to 55 centipoises and, in one instance, by viscosity of a 50 percent isopropanol dispersion of from 90 to 120 centipoises. This same manufacturer supplies polyvinyl alcohol wherein the saponification of polyvinyl acetate ranges from about 47 percent to about 100 percent. Although, in general, printing plates according to the invention carrying a dichromated polyvinyl alcohol resist can be produced from any such polyvinyl alcohol, it has been found that for optimum results the viscosity of the dichromated polyvinyl alcohol dispersion, when freshly prepared, should be from about 10 to about 120 centipoises, and most desirably from about 20, to about 60 centipoises. Similarly, for optimum results, the saponification of the freshly prepared polyvinyl alcohol dispersion should be from about 80 percent to about 100 percent, and most desirably from about 88 percent to about 94 percent.

When it is attempted to produce a dichromated polyvinyl alcohol resist from a dispersion having a viscosity, when freshly prepared, appreciably higher than the preferred upper limit indicated above for optimum results, halos are likely to be encountered, and the film of the polyvinyl alcohol resist is likely to be too thin to function satisfactorily. Although operating variables can be changed to minimize or completely to overcome these difficulties, the resulting process is comparatively unsatisfactory for commercial use because relatively close control is required. Similarly, if a dichromated polyvinyl alcohol dispersion having a viscosity, when freshly prepared, substantially less than the preferred lower limit indicated above for optimum results is employed the finished polyvinyl alcohol resist is too thin for satisfactory use unless commercially impracticable care is taken in processing. A polyvinyl alcohol resist prepared from a polyvinyl acohol having a saponification lower than about 80 percent is not sufficiently resistant to acid etching solutions unless the developing and hardening steps hereinafter described are carried out with greater care than is commercially practicable.

It has also been found that for optimum results the solids content of a polyvinyl alcohol dichromate dispersion to be used for making a resist should be from about 6 percent to about 14 percent, and, most desirably, from about 8 percent to about 10 percent. The terms "percent" and "parts" are used herein, and in the appended claims, to refer to percent and parts by weight, unless otherwise indicated. When it is attempted to produce such a resist from a dispersion above or below the indicated optimum range of solids content either too thick or too thin a coating results unless a centrifugal or other spreading operation hereinafter described is controlled more carefully than is commercially practicable.

A suitable dichromated polyvinyl alcohol dispersion is applied in an even film to a metal plate as a first step in producing a printing plate according to the invention. This step can be carried out by pouring such dispersion onto the plate and whirling the plate so that centrifugal force spreads it uniformly, or by a spreading or spraying operation followed by a "doctoring" to even thickness, or in any other desired way.

The dichromate light sensitizing agent in the polyvinyl alcohol dispersion can be any dichromate ordinarily used for such purpose in conventional resists. Ammonium dichromate and alkali metal dichromates are usually preferred as light sensitizing agents, ammonium dichromate being most preferred because greater fixation of chrome results from its use, and because the possibility of side reaction is minimized by volatilization of ammonia. It has been found that polyvinyl alcohol dispersions containing from about 2 percent to about 12 percent of a dichromate sensitizing agent are satisfactory for most uses. Percentages of dichromate sentitizing agent as recited herein and in the appended claims are based upon the dry weights of polyvinyl alcohol and dichromate, unless otherwise indicated.

After the metal plate has been coated with the light sensitized polyvinyl alcohol dispersion, as described above, it is then exposed to light in the usual manner so that the light-sensitive coating becomes hardened and insoluble in the exposed areas but remains soluble in the unexposed areas. The portion of the coating unaffected by light is then removed, and the light-affected portion further hardened by a combined developing and hardening dispersion. This step is accomplished merely by washing the exposed plate with a dilute aqueous dispersion of a developing agent. The washing can be accomplished by flowing the developing agent dispersion over the exposed coating, or by immersing the coating therein. The developing agent is preferably logwood, hematine, hematoxylin, or a mixture of hematine and hematoxylin. In general, the developing agent should be an aromatic dye, preferably a natural aromatic dye, having, in its molecular structure, a polyhydroxy aromatic ring. Examples of other such dyes, in addition to logwood, hematine and hematoxylin, that have been found to be effective as developing agents include quercitrin, catechin, fustin and hypernic. Structural formulas of the above-named developing agents are given below:

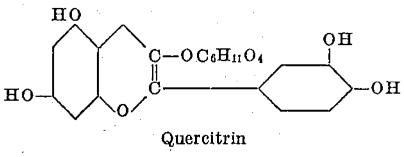

Quercitrin

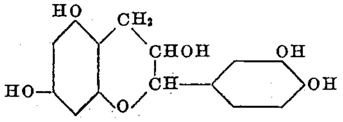

Catechin

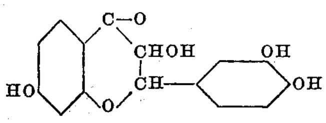

Fustin

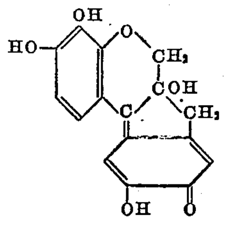

Hematine

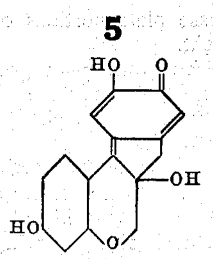

Hypernic

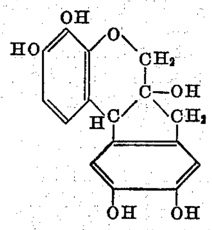

Hematoxylin

The dye "logwood" is a mixture of hematine and hematoxylin.

The amount of developing agent contained in the combined developing and hardening dispersion should be at least about 0.1 percent for its effect to be appreciably noticeable, and should preferably be at least about ½ percent. Ordinarily there is no reason for using more than about 6 percent of the developing agent and it is usually preferred to use not more than about 2 percent thereof, as additional amounts above about this maximum do not appreciably improve the effect achieved. Most desirably about 1 percent of the developing agent is employed in aqueous dispersion.

Once the desired pattern has been formed on the plate by removal of the portions of the polyvinyl alcohol film unaffected by light the light-developed plate is hardened by dipping it in a solution of chromic acid, and then drying, in a more or less conventional manner. For example, dipping a plate in a 2 percent to 4 percent aqueous solution of chromic acid for a period of one to three minutes has been found satisfactory.

The hardened and dried plate is then given an additional hardening and toughening treatment which consists in heating the plate to a relatively low temperature, for example between about 300° F. and about 400° F., it being necessary only to bring the temperature of the plate up to about that temperature without holding it there for any prolonged period of time. The resulting polyvinyl alcohol resist on the plate is almost completely hydrophobic, is firmly adhered to the metal sheet, is extremely resistant to acids, even including the new rapid etching acid solution discussed above, and is capable of use through many impressions before showing wear.

The use of a developing agent as above described is further advantageous for the reason that it has a dyeing effect upon the polyvinyl alcohol coating, so that a deep purple coating is produced, and a plate can be proof read without further treatment.

Although the invention is not limited to the following theoretical explanation, it is believed that the logwood, hematine, hematoxylin, or other developing agent actually reacts chemically with the polyvinyl alcohol resist that has been exposed to light, thus increasing its molecular weight. Further, the resulting molecular structure is more reactive with a chromic acid solution, so that the hardening effect thereof is also increased by the developing agent treatment.

It is known, for example, that tannic acid dissolved in the developing solution reduces the effectiveness of the developing agents. This interference is believed to be attributable to a competing reaction between the tannic acid and the polyvinyl alcohol, which decreases the extent of reaction between the developing agent and the polyvinyl alcohol. For this reason, it is usually preferred that developing solutions contain not more than about 0.25 percent of tannic acid, and most desired that they contain not more than about 0.1 percent.

The various steps in the production of a printing plate according to the invention are illustrated in the schematic flow diagram of Fig. 1.

Although the invention has been described in connection with preferred embodiments it will be apparent that various changes and modifications can be made without departing from the scope of the claims.

This is a continuation-in-part of my copending application Serial No. 371,901, filed August 3, 1953.

Having described the invention, I claim:

1. In a method for forming a printing plate which comprises coating a metal base plate with polyvinyl alcohol sensitized to light by a dichromate, exposing the coating to light in a desired design, washing from the metal base plate portions of the coating not affected by the light, subjecting the light-affected design of the coating to an aqueous chromic acid solution, washing the plate to remove the acid solution, drying and heat hardening the coating on the metal base plate, and etching the exposed portions of the plate, the improvement which consists in using an aqueous dispersion containing from about 0.1 percent to about 6.0 percent of hematine and hematoxylin for washing from the metal base plate portions of the coating not affected by the light.

2. In a method for forming a printing plate which comprises coating a metal base plate with polyvinyl alcohol sensitized to light by a dichromate, exposing the coating to light in a desired design, washing from the metal base plate portions of the coating not affected by the light, subjecting the light-affected design of the coating to an aqueous chromic acid solution, washing the plate to remove the acid solution, drying and heat hardening the coating on the metal base plate, and etching the exposed portions of the plate, the improvement which consists in using an aqueous dispersion containing from about ½ percent to about 2 percent of hematine and hematoxylin for washing from the metal base plate portions of the coating not affected by the light.

3. In a method for forming a printing plate which comprises coating a metal base plate with polyvinyl alcohol sensitized to light by a dichromate, exposing the coating to light in a desired design, washing from the metal base plate portions of the coating not affected by the light, subjecting the light-affected design of the coating to an aqueous chromic acid solution, washing the plate to remove the acid solution, drying and heat hardening the coating on the metal base plate, and etching the exposed portions of the plate, the improvement which consists in using an aqueous dispersion containing about 1 percent of hematine and hematoxylin for washing from the metal base plate portions of the coating not affected by the light.

4. In a method for forming a printing plate which includes coating a metal base plate with polyvinyl alcohol sensitized to light by a dichromate, exposing the coating to light in a desired design, washing from the metal base plate portions of the coating not affected by the light, subjecting the light-affected design of the coating to an aqueous chromic acid solution, washing the plate to remove the acid solution, drying and heat hardening the coating on the metal base plate, and etching the exposed portions of the plate, the improvement comprising using an aqueous dispersion containing from about 0.1 percent to about 6 percent of a developing agent for the light-affected polyvinyl alcohol coating for washing from the metal base plate portions of the coating not affected by the light, said developing agent being a dye having a polyhydroxy aromatic ring in its molecular structure, and being selected from the group consisting of hematine, hematoxylin, a mixture of hematine and hematoxylin, catechin, fustin, quercitrin and hypernic.

5. In a method for forming a printing plate which comprises coating a metal base plate with polyvinyl alcohol sensitized to light by a dichromate, exposing the coating to light in a desired design, washing from the metal base plate portions of the coating not affected by the light, subjecting the light-affected design of the coating to an aqueous chromic acid solution, washing the plate to remove the acid solution, drying and heat hardening the coating on the metal base plate, and etching the exposed portions of the plate, the improvement which consists in using an aqueous dispersion containing from about 0.1 percent to about 6.0 percent of catechin for washing from the metal base plate portions of the coating not affected by the light.

6. In a method for forming a printing plate which comprises coating a metal base plate with polyvinyl alcohol sensitized to light by a dichromate, exposing the coating to light in a desired design, washing from the metal base plate portions of the coating not affected by the light, subjecting the light-affected design of the coating to an aqueous chromic acid solution, washing the plate to remove the acid solution, drying and heat hardening the coating on the metal base plate, and etching the exposed portions of the plate, the improvement which consists in using an aqueous dispersion containing from about 0.1 percent to about 6.0 percent of fustin for washing from the metal base plate portions of the coating not affected by the light.

7. In a method for forming a printing plate which comprises coating a metal base plate with polyvinyl alcohol sensitized to light by a dichromate, exposing the coating to light in a desired design, washing from the metal base plate portions of the coating not affected by the light, subjecting the light-affected design of the coating to an aqueous chromic acid solution, washing the plate to remove the acid solution, drying and heat hardening the coating on the metal base plate, and etching the exposed portions of the plate, the improvement which consists in using an aqueous dispersion containing from about 0.1 percent to about 6.0 percent of quercitrin for washing from the metal base plate portions of the coating not affected by the light.

8. In a method for forming a printing plate which comprises coating a metal base plate with polyvinyl alcohol sensitized to light by a dichromate, exposing the coating to light in a desired design, washing from the metal base plate portions of the coating not affected by the light, subjecting the light-affected design of the coating to an aqueous chromic acid solution, washing the plate to remove the acid solution, drying and heat hardening the coating on the metal base plate, and etching the exposed portions of the plate, the improvement which consists in using an aqueous dispersion containing from about 5.3 percent to about 13.7 percent of polyvinyl alcohol, said polyvinyl alcohol being frm 80 percent to 94 percent saponified, and having a molecular weight such that an aqueous dispersion of said polyvinyl alcohol containing from 2 percent to 12 percent of a dichromate light sensitizer, on a dry solids basis, and from about 6 percent to about 14 percent of total solids, has a viscosity of from about 10 centipoises to about 60 centipoises as the polyvinyl alcohol sensitized to light, and using an aqueous dispersion containing from about 0.1 percent to about 6.0 percent of hematine and hematoxylin for washing from the metal base plate portions of the coating not affected by the light.

9. In a method for forming a printing plate which comprises coating a metal base plate with polyvinyl alcohol sensitized to light by a dichromate, exposing the coating to light in a desired design, washing from the metal base plate portions of the coating not affected by the light, subjecting the light-affected design of the coating to an aqueous chromic acid solution, washing the plate to remove the acid solution, drying and heat hardening the coating on the metal base plate, and etching the exposed portions of the plate, the improvement which consists in using an aqueous dispersion containing from about 5.3 percent to about 13.7 percent of polyvinyl alcohol, said polyvinyl alcohol being from 80 percent to 94 percent saponified, and having a molecular weight such that an aqueous dispersion of said polyvinyl alcohol containing from 2 percent to 12 percent of a dichromate light sensitizer, on a dry solids basis, and from about 6 percent to about 14 percent of total solids, has a viscosity of from about 10 centipoises to about 60 centipoises as the polyvinyl alcohol sensitized to light, and using an aqueous dispersion containing from about ½ percent to about 2 percent of hematine and hematoxylin for washing from the metal base plate portions of the coating not affected by the light.

10. In a method for forming a printing plate which comprises coating a metal base plate with polyvinyl alcohol sensitized to light by a dichromate, exposing the coating to light in a desired design, washing from the metal base plate portions of the coating not affected by the light, subjecting the light-affected design of the coating to an aqueous chromic acid solution, washing the plate to remove the acid solution, drying and heat hardening the coating on the metal base plate, and etching the exposed portions of the plate, the improvement which consists in using an aqueous dispersion containing from about 5.3 percent to about 13.7 percent of polyvinyl alcohol, said polyvinyl alcohol being from 80 percent to 94 percent saponified, and having a molecular weight such that an aqueous dispersion of said polyvinyl alcohol containing from 2 percent to 12 percent of a dichromate light sensitizer, on a dry solids basis, and from about 6 percent to about 14 percent of total solids, has a viscosity of from about 10 centipoises to about 60 centipoises as the polyvinyl alcohol sensitized to light, and using an aqueous dispersion containing about 1 percent of hematine and hematoxylin for washing from the metal base plate portions of the coating not affected by the light.

References Cited in the file of this patent

UNITED STATES PATENTS

| | | |
|---|---|---|
| 2,174,629 | Greiner | Oct. 3, 1939 |
| 2,184,311 | Meigs | Dec. 26, 1939 |
| 2,702,243 | Schmidt | Feb. 15, 1955 |

OTHER REFERENCES

Modern Photoengraving, Flader and Mertle, Modern Photoengraving Publishers (Chicago). Copyright, 1948; pages 161, 162.

"Elvanol" Polyvinyl Alcohols, issued by E. I. du Pont de Nemours & Co. (Wilmington), second printing. Copyright 1947; pages 4, 5, 23.